(12) United States Patent
Seo

(10) Patent No.: US 6,654,605 B1
(45) Date of Patent: Nov. 25, 2003

(54) POINT TO MULTIPOINT RADIO DATA SERVICE

(75) Inventor: Jae Joon Seo, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/442,748

(22) Filed: Nov. 18, 1999

(30) Foreign Application Priority Data

Dec. 4, 1998 (KR) .............................................. 98-53163

(51) Int. Cl.$^7$ ................................................ H04Q 7/20
(52) U.S. Cl. ...................... 455/426; 455/557; 455/503; 455/59; 455/560; 455/416; 379/100.01; 379/100.12; 379/100.09; 379/100.17; 370/352; 370/347; 375/222
(58) Field of Search .................. 455/503, 59, 426, 455/557, 560, 445, 416; 379/93.07, 93.04, 100.01, 100.12, 100.09, 100.17; 370/352; 375/222; 358/400

(56) References Cited

U.S. PATENT DOCUMENTS

| | | | | |
|---|---|---|---|---|
| 5,600,704 A | * | 2/1997 | Ahlberg et al. ............. | 455/445 |
| 5,668,862 A | * | 9/1997 | Bannister et al. ...... | 379/207.14 |
| 5,802,160 A | * | 9/1998 | Kugell et al. .......... | 379/211.04 |
| 5,884,270 A | | 3/1999 | Walker et al. .................. | 705/1 |
| 5,884,272 A | | 3/1999 | Walker et al. .................. | 705/1 |
| 5,887,408 A | | 3/1999 | Wagner et al. ................ | 53/411 |
| 5,917,615 A | * | 6/1999 | Reifman et al. ............ | 358/468 |
| 5,950,200 A | | 9/1999 | Sudai et al. .................... | 707/9 |
| 5,963,864 A | * | 10/1999 | O'Neil et al. ................ | 455/445 |
| 6,112,084 A | * | 8/2000 | Sicher et al. ................ | 455/426 |
| 6,275,575 B1 | * | 8/2001 | Wu ........................ | 379/202.01 |

* cited by examiner

Primary Examiner—William Trost
Assistant Examiner—Danh Le
(74) Attorney, Agent, or Firm—Fleshner & Kim, LLP

(57) ABSTRACT

A point to multipoint radio service is disclosed which enables a mobile telephone network subscriber to transmit data simultaneously to a plurality of public switched telephone network subscribers. According to the present invention, a plurality of calls originate from the mobile telephone network subscriber, modems in an interworking function device are allocated with respect to the calls, and then wire modems and traffic paths of the PSTN subscribers are established corresponding to the originating calls after the modem allocation.

36 Claims, 4 Drawing Sheets

POINT TO MULTIPOINT RADIO DATA SERVICE

BACKGROUND OF THE INVENTION

1. Field of the Invention

The present invention relates to a method of point to multipoint radio service, and more particularly to a data transmission by which a mobile telephone network subscriber can transmit data simultaneously to a plurality of public switched telephone network (PSTN) subscribers.

2. Description of the Related Art

Generally, an interworking function device (IWF) is used as an interface between a mobile communication network and other networks. Through the IWF, data from a subscriber of mobile communication network such as a digital mobile telephone network or personal communication network is transmitted to a PSTN subscriber which is a wire telephone network. FIG. 1 is a block diagram of a conventional mobile communication network interworking with the PSTN.

Referring to FIG. 1, a conventional mobile communication network interworking with the PSTN through the IWF includes a terminal equipment (TE) 1, a mobile terminal (MT) 2 connected to the terminal equipment, a base station (BS) 3 providing a wireless channel connection to the mobile terminal 2, a base station controller (BSC)/mobile switching center (MSC) 4, a IWF 5 connected to the BSC/MSC 4 performing an interworking function between the mobile communication network and other networks, a PSTN 10 interworking with the mobile communication network, a wire modem 11 connected to the PSTN, and a terminal 15 connected to the wire modem.

The TE 1 includes a mobile equipment such as a notebook computer and a typical communication emulator to enable data communication. The terminal 15 may be another TE including equipment such as a typical computer or facsimile machine.

The IWF 5 includes a first block 6 connected to the MSC for determining and releasing a wireless data communication path; a second block 7 provided with the traffic data path from the connection of the first block 6 to the MSC for performing data transmission/reception with the mobile terminal in an end-to-end manner using an upper protocol over a network hierarchy; a third block 8 also connected to the MSC for determining a link with the PSTN; and a fourth block 9 provided with the traffic data path to the wire modem 11 through a modem pool from the connection of the MSC to the third block for performing data transmission/reception with the wire modem 11.

In a typical mobile communication network interworking with the PSTN, the wireless data service for digital mobile and personal communication networks utilizing the IWF allows only a one-to-one communication when transmitting circuit data and facsimile data. Accordingly, when a mobile communication subscriber intends to transmit circuit data or facsimile data to a plurality of PSTN subscribers through a mobile terminal, the subscriber must repeatedly transmit the data to each PSTN subscribers one by one, which takes a significant amount of time.

SUMMARY OF THE INVENTION

Accordingly, an object of the present invention is to solve at least the problems and disadvantages of the related art.

An object of the present invention is to provide point to multipoint radio service which enables a mobile telephone network subscriber to simultaneously transmit data to a plurality of PSTN subscribers.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a multiple uni-directional radio data service method includes originating a call simultaneously to a plurality of PSTN subscribers based upon inputs from a mobile telephone network subscriber; processing the call and allocating a plurality of modems in an interworking function device based upon the call; and determining traffic paths between the plurality of modems in an interworking function device and wire modems of the plurality of PSTN subscribers.

In the above method, the call may be originated by inputting an AT instruction; inputting a desired telephone number after the AT instruction; inputting a first specified sign after the telephone number to identify the inputted telephone number; inputting other telephone numbers by repeating the steps of inputting the telephone number and the first specified sign; and inputting a second specified sign to identify an input of a final telephone number.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Figure 3:
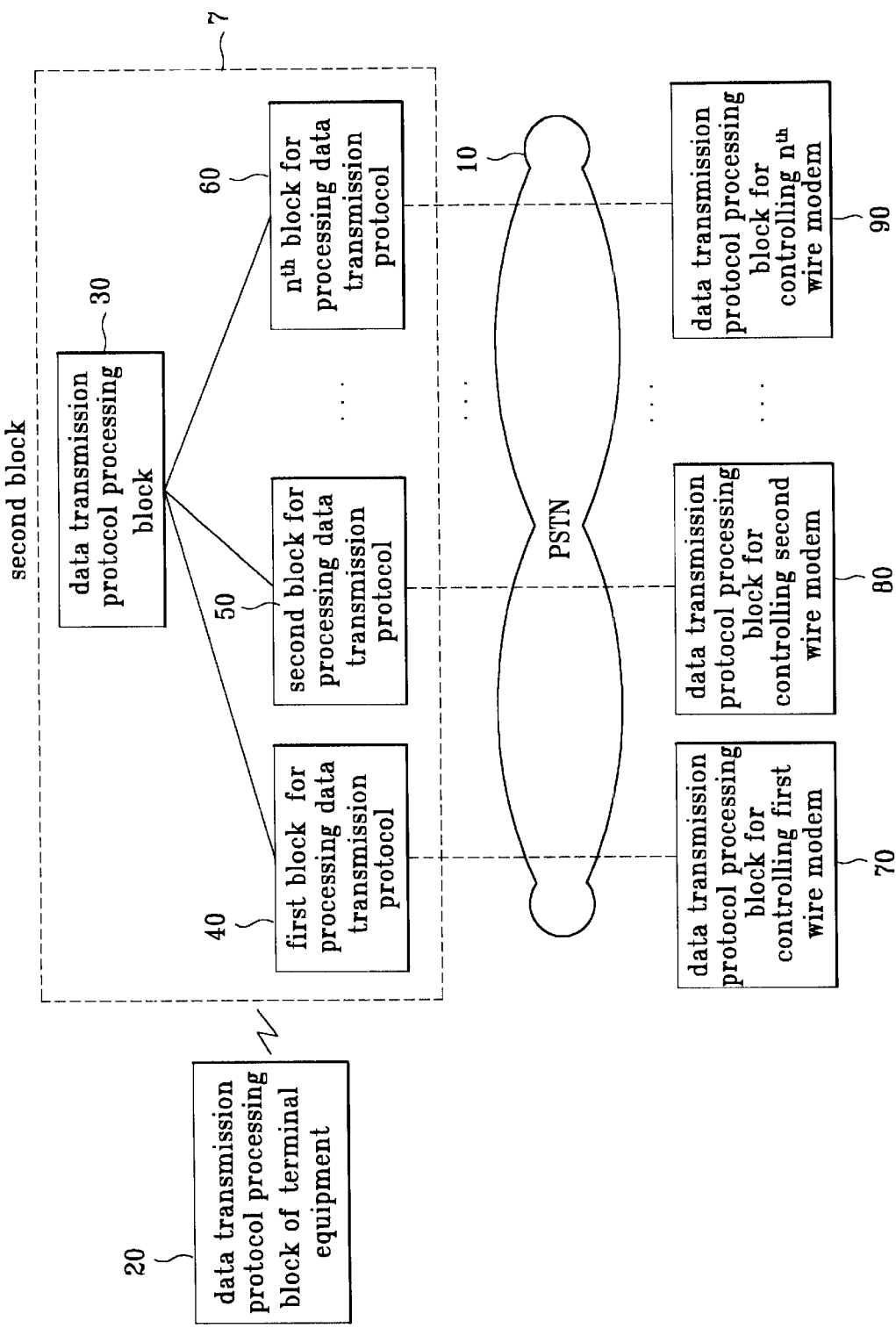
FIG. 3 illustrates the structure of a block for processing the data transmission protocol of the application hierarchy according to the present invention.
Figure 4:
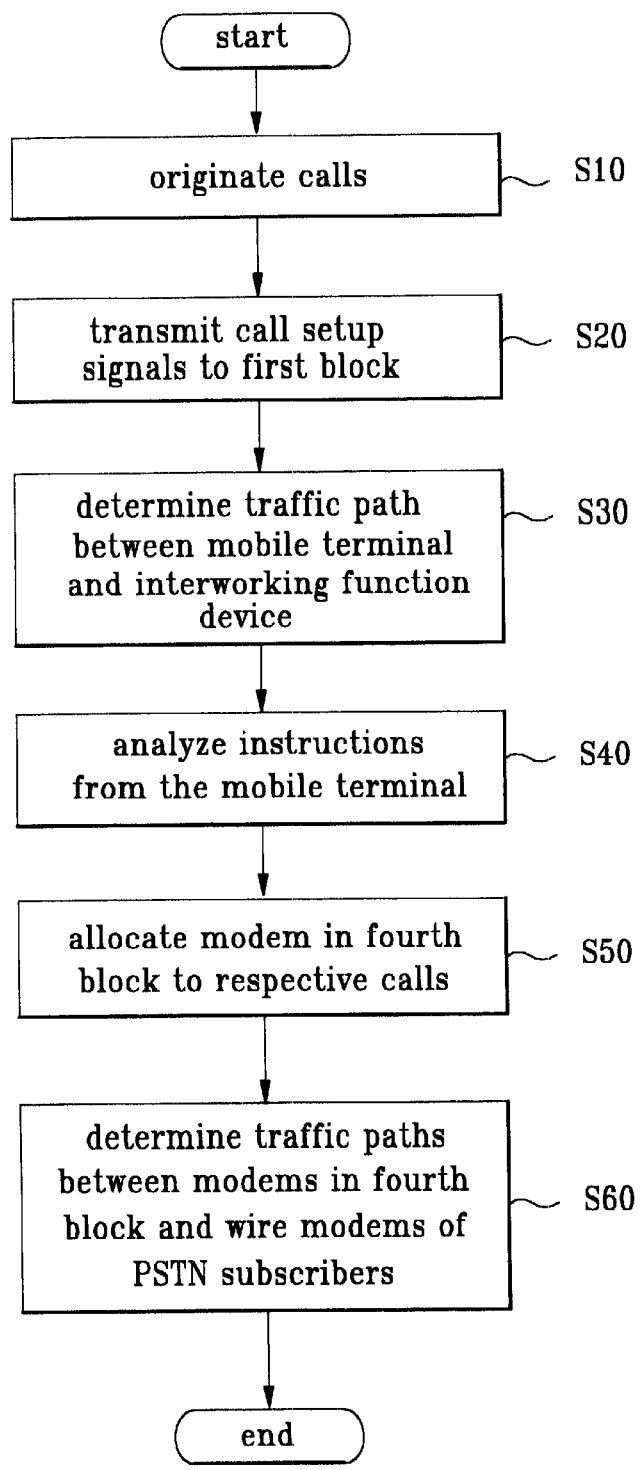
FIG. 4 is a flowchart illustrating the point to multipoint radio service method according to the present invention.

Reference will now be made in detail to the preferred embodiment of the present invention, examples of which are illustrated in the accompanying drawings. Particularly, FIG. 2 shows the structure of a mobile communication network interworking with a PSTN according to the present invention, FIG. 3 illustrates the structure of a block for processing the data transmission protocol of the application hierarchy, and FIG. 4 is a flowchart illustrating the point to multipoint radio service method according to the present invention.

Figure 1:
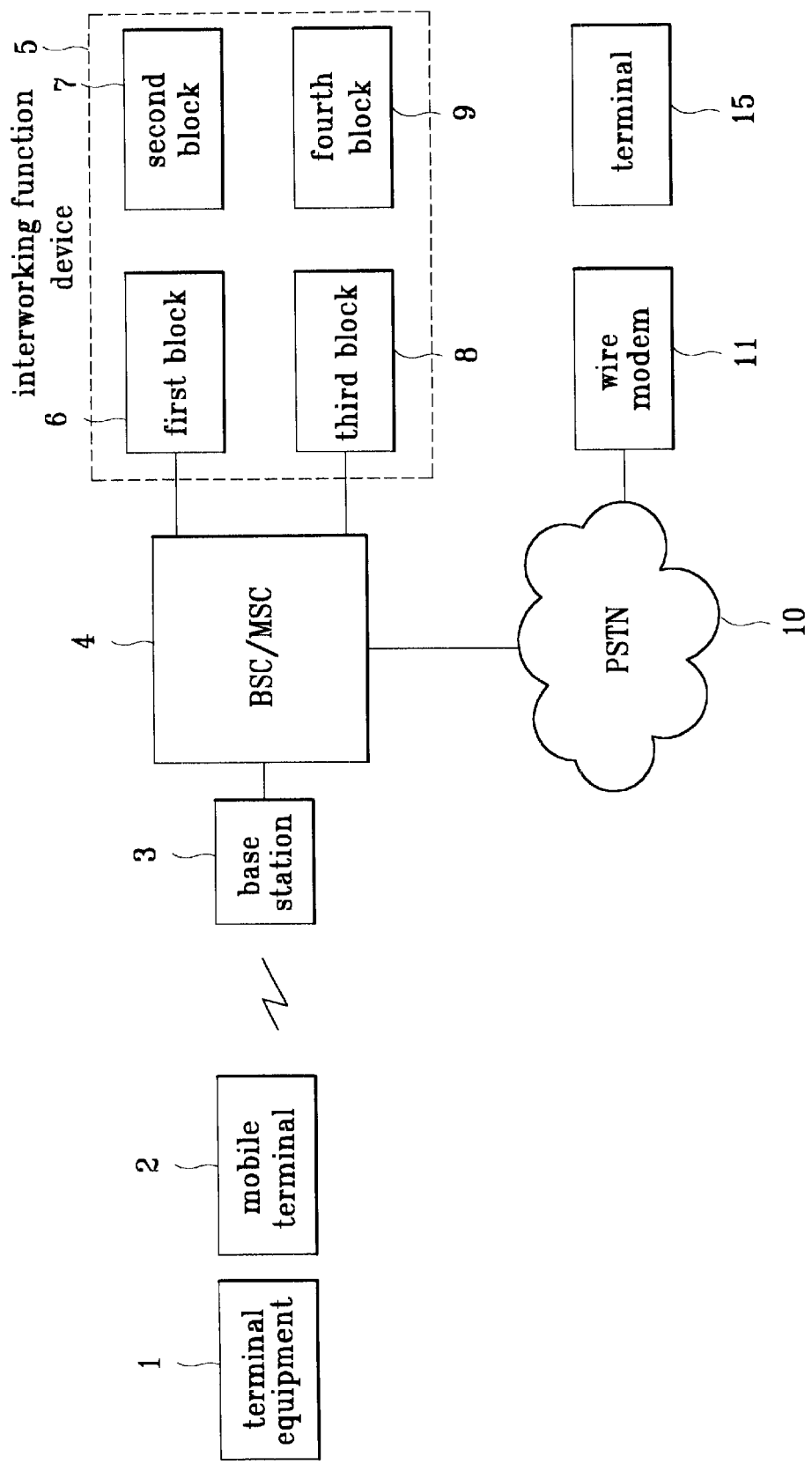
FIG. 1 is a block diagram of a typical mobile communication network interworking with a PSTN.
Figure 2:
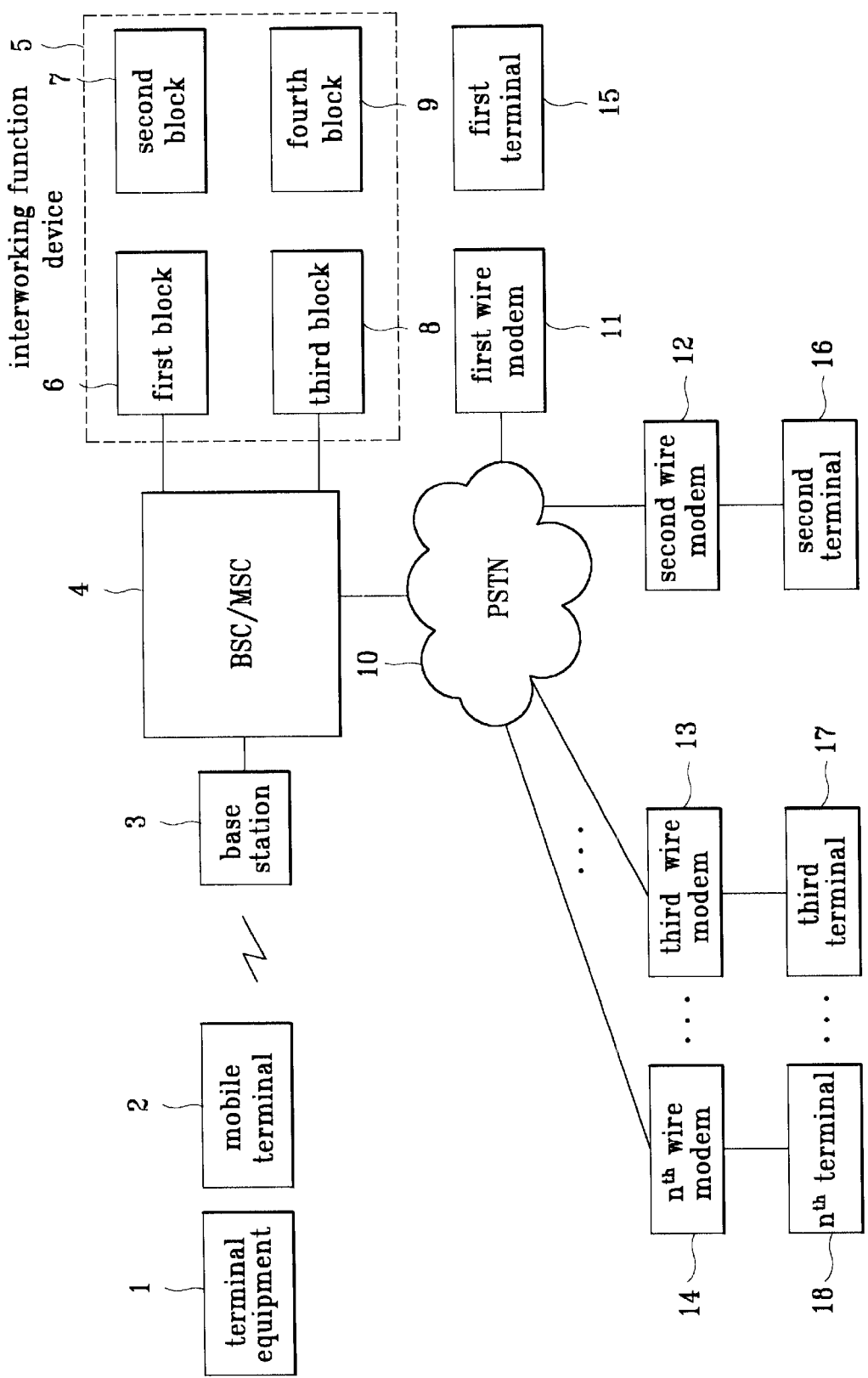
FIG. 2 is a block diagram of the mobile communication network interworking with a PSTN according to the present invention.

Referring to FIG. 2, the mobile communication network interworking with the PSTN according to the present invention includes a terminal equipment (TE) 1, a mobile terminal (MT) 2 connected to the TE, a base station (BS) 3 providing a wireless channel connection to the mobile terminal 2, a base station controller (BSC)/mobile switching center (MSC) 4 controlling the BSC and exchanging data with the BSC, an interworking function device (IWF) 5 connected to the BSC/MSC 4 performing an interworking function between the mobile communication network and other networks, a PSTN 10 interworking with the mobile communication network, a plurality of wire modems 11~14 connected to the PSTN, and a plurality of terminals 15~18 respectively connected to the plurality of wire modems.

As in the related art, the IWF 5 includes a first block 6 connected to the MSC for determining and releasing a wireless data communication path; a second block 7 provided with the traffic data path from the connection of the first block 6 to the MSC for performing data transmission/reception with the mobile terminal in an end-to-end manner using an upper protocol over a network hierarchy; a third block 8 also connected to the MSC for determining a link with the PSTN; and a fourth block 9 provided with the traffic data path to the wire modem 11 through a modem pool from the connection of the MSC to the third block for performing data transmission/reception with the wire modem 11.

Also, as in the related art, the TE 1 includes a movable equipment such as a notebook computer and a typical communication emulator to enable data communication. The terminals 15~18 may each be a terminal equipment including a typical computer or facsimile machine.

Referring to FIGS. 2 and 3, however, the present invention includes a data transmission protocol processing block 20 in the TE 1 and a data transmission protocol processing block 30 in the second block 7 of the IWF 5. The data transmission protocol processing block 20 processes a protocol for the data transmission of the communication emulator and the data transmission protocol processing block 30 enables the IWF 5 device to receive data through wireless transmission by protocol negotiations with the data transmission protocol processing block 20.

The present invention further includes a plurality data transmission protocol processing blocks 40~60 in the second block 7 of the IWF 5 for processing a protocol for the data transmission between a modem in the fourth block of the IWF 5 and a wire modem of a PSTN subscriber, and a plurality of wire data transmission protocol blocks 70~90. The plurality of data transmission protocol processing blocks 40~60 are controlled by the data transmission protocol processing block 30 and created based upon the number of telephone numbers determined by a mobile telephone network subscriber. The plurality of wire data transmission protocol processing blocks 70~90 processes a protocol for the data transmission with the modem in the fourth block of the IWF by controlling the wire modem of the PSTN subscriber. Here, the data transmission protocol processing block 20 of the TE 1 mainly uses a Z-modem protocol.

According to the point to multipoint radio service method of the present invention, as shown in FIG. 4, the communication emulator in the TE 1 connected to the mobile terminal originates a call using an AT instruction (step S10). At this time, in order for a subscriber of the mobile telephone network to transmit data to a plurality of subscribers of the PSTN, a new instruction which is different from the existing AT instruction must be input.

Accordingly, a subscriber may input a desired telephone number after an ATDT, and may input another telephone number after a first specified sign. Thereafter, the subscriber may continue to input other telephone numbers in the same manner, and then finally input a second specified sign to identify the end of the input. For example, the subscriber may make a phone call by inputting "ATDT9875678;36792000;1234567:," wherein a semi-colon ';' is used as the first specified sign and a colon ':' is used as the second specified sign. Although a semi-colon and a colon was used in the above example, any symbol such as a comma for the first and a period for the second may be utilized to designate either the first and/or second specified signs as long as two different symbols are utilized.

After a call is originated, the MSC determines a wireless path between the mobile terminal and the MSC, determines through a service option if a data service is required, and then transmits a call setup signal to the first block 6 of the IWF 5 if the call is for the data service (step S20). The first block 6 which receives the call setup signal is allocated with a resource from the second block 7 and determines the traffic path for the originating call (step S30), such that the mobile terminal and the second block 7 can mutually transmit/receive data through the traffic path in accordance with the transmission protocol.

The second block 7 next analyzes the AT instruction transmitted from the mobile terminal (step S40), and allocates to the fourth block 9 modems and resources based upon respective telephone numbers requested by the mobile telephone network subscriber (step S50). The second block 7 also requests the third block 8 to determine paths to the PSTN subscribers corresponding to the telephone numbers requested by the mobile telephone network subscriber.

After completion of the path determination with the PSTN subscribers, negotiations between the modems in the fourth block 9 and the wire modems of the PSTN subscribers are performed to establish the final traffic paths (step S60), thus enabling the data transmission.

While a subscriber of the mobile telephone network is connected to a plurality of PSTN subscribers for data transmission, the subscriber may further enter instructions such as an instruction to disconnect or add a call to one particular PSTN subscriber by inputting a specified symbol. For example, when a symbol such as "+++" is input through the communication emulator, the subscriber may enter a mode in which further AT instructions can be input. Particularly, when a subscriber inputs "+++" followed by a pound sign "#" and a telephone number of a particular PSTN subscriber, the second block 7 would analyze the AT instruction transmitted from the mobile terminal and initiate a disconnection with the particular PSTN subscriber based upon the input telephone number. Similarly, when a subscriber inputs "+++" followed by a star sign "*" and a telephone number of a particular PSTN subscriber, the second block 7 would analyze the AT instruction transmitted from the mobile terminal, and allocate to the fourth block 9 a modem and resource based upon the input telephone number from the subscriber. Although a pound sign and a star was used in the above example, other symbols may be utilized.

To accomplish the transmission in step S60, one traffic path is established between the mobile terminal and the second block 7. Also, a plurality of modems equivalent to the number of telephone numbers input by the mobile telephone network subscriber are created in the fourth block 9. Accordingly, each modem is paired with a wire modem of a PSTN subscriber corresponding to one of the input telephone number, thereby establishing a traffic path between the pair. Moreover, the second block 7 receives the transmitted data through wireless transmission, and copies the data into each modem in the fourth block 9 corresponding created for the transmission of the data.

However, because data transmission speeds between the pairs of modems may be different, the data transmission speed between the mobile terminal and the second block 7 are adjusted based on the pair of the modems having the lowest transmission speed. Furthermore, to distinguish which wire modems are to be used for data transmission to the respective PSTN subscribers, the second block 7 provides identification (ID) numbers to the respective modems during the process of allocating the modem resources according to the telephone numbers requested by the mobile telephone network subscriber. Thus, during the negotiations between the modems in the fourth block 9 and the wire modems or facsimiles of the PSTN subscriber, or during the transmission of the AT instruction to the mobile terminal, the ID numbers of the modems are included and transmitted with the data for transmission.

Specifically, if the mobile telephone network subscriber makes a phone call to PSTN subscribers using the AT instruction, the subscriber can first see and identify the ID numbers of the modems and the corresponding telephone numbers of the PSTN subscribers through a display of the mobile terminal. Furthermore, the subscriber may also see the connected states to the modems and/or the corresponding data transmission speeds in the display. For example, the mobile telephone network subscriber may first see "01:1234567 02:3456789 . . . ," followed by "01:Connected:19200 02:Connected:38400 . . . ," wherein "01" and "02" denote modem ID numbers, "1234567" and "3456789" denote telephone numbers of the PSTN subscribers, "Connected" denotes the connected state, and "19200" and "38400" denote the data transmission speeds.

In sum, the point to multipoint radio service of the present invention enables a mobile telephone network subscriber to transmit circuit data or facsimile data simultaneously to a plurality of PSTN subscribers, thereby reducing the time required for the data transmission as well as it providing significant convenience to a user. Also, according to the present invention, simultaneous data transmission to a plurality of PSTN subscribers is performed using one traffic path of the wireless transmission section. Thus wireless resources which are restricted by the data transmission speed can be utilized effectively.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for point to multipoint radio service comprising:
    (a) originating a call simultaneously to a plurality of PSTN subscribers based upon inputs from a mobile telephone network subscriber;
    (b) processing the call and allocating a plurality of modems in an interworking function device based upon the call;
    (c) determining traffic paths between the plurality of modems in an interworking function device and wire modems of the plurality of PSTN subscribers; and
    (d) transmitting data from the mobile telephone network subscriber to the plurality of PSTN subscribers.

2. A method of claim 1, wherein in (a), the inputs comprises an AT instruction, a telephone number after the AT instruction, at least one other telephone number, a first symbol between each input telephone number, and a second symbol after the last input telephone number; and wherein in (a) utilizing the first symbol to distinguish each input telephone number and utilizing the second symbol to determine an end of the input telephone numbers.

3. A method of claim 2, wherein in (b), allocating the plurality of modems equivalent to the number of input telephone numbers.

4. A method of claim 3, wherein in (c), determining traffic paths includes pairing each modem of the plurality of modems in a interworking function device with one of a wire modem of the plurality of PSTN subscribers.

5. A method of claim 4, wherein data transmission speeds of the modem pairs are adjusted based on a modem pair having the lowest transmission speed.

6. A method of claim 2, wherein in (b), allocating the plurality of modems, each with an identification number corresponding to one of the input telephone number.

7. A method of claim 6, further comprising displaying the identification number of each allocated modem and the corresponding telephone number to the mobile telephone network subscriber.

8. A method of claim 7, further comprising displaying a connection status of each allocated modem to the mobile telephone network subscriber.

9. A method of claim 1, further comprising:
    (e) disconnecting a call to one of the plurality of PSTN subscribers based upon inputs from the mobile telephone network subscriber while transmitting data in (d).

10. A method of claim 9, wherein in (e), the inputs comprises a first symbol followed by a second symbol and then by a telephone number; wherein the first symbol is utilized to input further AT instructions and the second symbol indicates an instruction to initiate a disconnection with one of the plurality of PSTN subscriber corresponding to the telephone number.

11. A method of claim 1, further comprising:
    (f) adding a PSTN subscriber to the originated call based upon inputs from the mobile telephone network subscriber while transmitting data in (d).

12. A method of claim 11, wherein in (f), the inputs comprises a first symbol followed by a second symbol and then by a telephone number; wherein the first symbol is utilized to input further AT instructions and the second symbol indicates an instruction to originate a call to the PSTN subscriber corresponding to the telephone number.

13. A method of claim 1, wherein in (b), processing the call includes:
    determining wireless path between a mobile terminal of the mobile telephone network subscriber and the interworking function device;
    determining through a service option if a data service is required;
    sending a call setup signal to the interworking function device if the call is for the data service; and
    determining a traffic path between said mobile terminal and the interworking function device for exchanging data in accordance with a transmission protocol.

14. A method of claim 1, wherein in (d) transmitting the data includes copying the data into each allocated modem in the interworking function device.

15. A method of claim 1, wherein the inputs include an instruction indicative of point-to-multipoint radio service and destination information for the plurality of PSTN subscribers.

16. A method for point to multipoint radio service comprising:
    (a) originating a call simultaneously to a plurality of PSTN subscribers based upon AT instruction, a telephone number after the AT instruction, at least one other telephone number, a first symbol between each input telephone number, and a second symbol after the last input telephone number input by a mobile telephone network subscriber;

(b) processing the call and allocating a plurality of modems in an interworking function device based upon the call, wherein the number of allocated modems equals the number of input telephone numbers and wherein the plurality of modems is allocated each with an identification number corresponding to one of the input telephone number;

(c) determining traffic paths between the plurality of modems in an interworking function device and wire modems of the plurality of PSTN subscribers; and (d) transmitting data from the mobile telephone network subscriber to the plurality of PSTN subscribers.

17. A method of claim 16, wherein in (c), determining traffic paths includes pairing each modem of the plurality of modems in a interworking function device with one of a wire modem of the plurality of PSTN subscribers; and wherein data transmission speeds of the modem pairs are adjusted based on a modem pair having the lowest transmission speed.

18. A method of claim 17, further comprising displaying a connection status of each allocated modem and the corresponding transmission speed to the mobile telephone network subscriber.

19. A method of claim 16, further comprising displaying the identification number of each allocated modem and the corresponding telephone number to the mobile telephone network subscriber.

20. A method for point to multipoint radio service comprising:

(a) originating a call simultaneously to a plurality of PSTN subscribers based upon AT instruction, a telephone number after the AT instruction, at least one other telephone number, a first symbol between each input telephone number, and a second symbol after the last input telephone number input by a mobile telephone network subscriber;

(b) determining wireless path between a mobile terminal of the mobile telephone network subscriber and an interworking function device;

(c) determining through a service option if a data service is required;

(d) sending a call setup signal to the interworking function device if the call is for the data service;

(e) determining a traffic path between said mobile terminal and the interworking function device for exchanging data in accordance with a transmission protocol;

(f) allocating a plurality of modems in the interworking function device based upon the call;

(g) determining traffic paths between the plurality of modems in an interworking function device and wire modems of the plurality of PSTN subscribers; and (h) transmitting data from the mobile telephone network subscriber to the plurality of PSTN subscribers.

21. A method of claim 20, wherein in (f), allocating the plurality of modems equivalent to the number of input telephone numbers.

22. A method for providing point-to-multipoint communications between networks, comprising:

receiving an instruction for simultaneously communicating a call from a terminal of a mobile network to at least two terminals of another network;

establishing respective communication paths between said at least two terminals and an equal number of modems based on said instruction; and sending call information from the terminal of the mobile network to said at least two terminals over the communication paths formed in said establishing step.

23. The method of claim 22, wherein said instruction includes information which identifies destinations of said at least two terminals of said another network.

24. The method of claim 23, wherein said another network is a public switched telephone network, and wherein said destination information includes telephone numbers of said at least two terminals.

25. The method of claim 22, wherein at least said receiving and establishing steps are performed in an interworking function device.

26. The method of claim 22, further comprising:

generating status information indicating a connection state between at least one of said modems and one of said at least two terminals of said another network.

27. The method of claim 26, further comprising:

transmitting said status information to the terminal of the mobile network.

28. The method of claim 22, wherein the instruction is received over a z-modem protocol.

29. A method for initiating point-to-multipoint communications, comprising:

generating an instruction for simultaneously communicating a call from a terminal of a mobile network to at least two terminals of another network; and transmitting call information from the terminal of the mobile network to said at least two terminals in accordance with said instruction, wherein said another network is a public switched telephone network, wherein said generating step includes receiving information indicative of telephone numbers corresponding to respective ones of said at least two terminals on the public switched telephone network, and wherein separators are respectively disposed between the telephone numbers within said instruction.

30. The method of claim 29, wherein said information indicative of telephone numbers is input by a user using an input device of the terminal of the mobile network.

31. The method of claim 29, wherein said information indicative of telephone numbers and said separators are input by a user using an input device of the terminal of the mobile network.

32. The method of claim 29, further comprising:

disconnecting transmission of said call information to only one of said at least two terminals of said another network based on a disconnect instruction generated by a user.

33. The method of claim 29, further comprising:

sending said call information to an additional terminal of said another network based on an add instruction generated by a user, said sending step being performed during said transmitting step.

34. The method of claim 29, further comprising:

receiving status information indicating a connection state between the terminal of said mobile network and one of said at least two terminals of said another network.

35. The method of claim 34, further comprising:

displaying said instruction.

36. The method of claim 29, further comprising:

displaying said instruction.

* * * * *